(12) United States Patent
Pezeshki et al.

(10) Patent No.: US 11,595,847 B2
(45) Date of Patent: Feb. 28, 2023

(54) CONFIGURATION OF ARTIFICIAL INTELLIGENCE (AI) MODULES AND COMPRESSION RATIOS FOR USER-EQUIPMENT (UE) FEEDBACK

(71) Applicant: QUALCOMM Incorporated, San Diego, CA (US)

(72) Inventors: Hamed Pezeshki, San Diego, CA (US); Tao Luo, San Diego, CA (US); Sony Akkarakaran, Poway, CA (US); Mahmoud Taherzadeh Boroujeni, San Diego, CA (US); Taesang Yoo, San Diego, CA (US); Arumugam Chendamarai Kannan, San Diego, CA (US); Jingchao Bao, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 79 days.

(21) Appl. No.: 17/116,901

(22) Filed: Dec. 9, 2020

(65) Prior Publication Data
US 2021/0195462 A1   Jun. 24, 2021

Related U.S. Application Data

(60) Provisional application No. 62/950,703, filed on Dec. 19, 2019.

(51) Int. Cl.
| | |
|---|---|
| *H04W 28/06* | (2009.01) |
| *G06N 20/00* | (2019.01) |
| *H04B 7/0456* | (2017.01) |
| *H04B 7/06* | (2006.01) |
| *H04W 24/10* | (2009.01) |

(Continued)

(52) U.S. Cl.
CPC ............ *H04W 28/06* (2013.01); *G06N 20/00* (2019.01); *H04B 7/0486* (2013.01); *H04B 7/0626* (2013.01); *H04B 7/0639* (2013.01); *H04W 24/10* (2013.01); *H04W 72/042* (2013.01); *H04W 76/27* (2018.02); *H04W 80/02* (2013.01)

(58) Field of Classification Search
CPC ... H04W 28/06; H04W 24/10; H04W 72/042; H04W 76/27; H04W 80/02; G06N 20/00; G06N 3/0454; G06N 3/084; G06N 3/088; H04B 7/0486; H04B 7/0626; H04B 7/0639; H04B 7/0632; H04B 7/063
See application file for complete search history.

(56) References Cited

U.S. PATENT DOCUMENTS 9,654,192 B2 * 5/2017 Yu .......................... H04B 7/0452
2020/0053408 A1 * 2/2020 Park ....................... H04N 19/439
(Continued)

*Primary Examiner* — Harry H Kim
(74) *Attorney, Agent, or Firm* — Patterson + Sheridan, L.L.P.

(57) ABSTRACT

Certain aspects of the present disclosure provide techniques for feedback compression. Certain aspects provide a method for wireless communication by a user-equipment (UE). The method generally includes receiving, from a base station, a configuration to be used for compressing one or more measurements corresponding to at least one reference signal using an artificial intelligence (AI) encoder; receiving the at least one reference signal; and transmitting a codeword to the base station, the codeword being associated with a compression of the one or more measurements in accordance with the configuration.

35 Claims, 8 Drawing Sheets

(51) Int. Cl.
*H04W 72/04* (2009.01)
*H04W 76/27* (2018.01)
*H04W 80/02* (2009.01)
*G06N 3/04* (2006.01)
*G06N 3/08* (2006.01)

(56) References Cited

U.S. PATENT DOCUMENTS

2020/0322027 A1* 10/2020 Tosato ................. H04B 7/0639
2021/0160149 A1* 5/2021 Ma ...................... H04L 41/0803
2022/0005233 A1* 1/2022 Kudo .................... G06N 3/084

* cited by examiner

CONFIGURATION OF ARTIFICIAL INTELLIGENCE (AI) MODULES AND COMPRESSION RATIOS FOR USER-EQUIPMENT (UE) FEEDBACK

CROSS-REFERENCE TO RELATED APPLICATION

This application claims benefit of and priority to U.S. Provisional Application No. 62/950,703, filed Dec. 19, 2019, which is hereby assigned to the assignee hereof and hereby expressly incorporated by reference herein in its entirety as if fully set forth below and for all applicable purposes.

INTRODUCTION

Aspects of the present disclosure relate to wireless communications, and more particularly, to techniques for feedback signal compression.

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved feedback signaling.

Certain aspects provide a method for wireless communication by a user-equipment (UE). The method generally includes receiving, from a base station, a configuration to be used for compressing one or more measurements corresponding to at least one reference signal using an artificial intelligence (AI) encoder, receiving the at least one reference signal, and transmitting a codeword to the base station, the codeword being associated with a compression of the one or more measurements in accordance with the configuration.

Certain aspects provide a method for wireless communication by a base station. The method generally includes transmitting, to a UE, a configuration to be used for compressing one or more measurements corresponding to at least one reference signal using an AI encoder, transmitting the at least one reference signal, receiving a codeword having a compressed version of the one or more measurements, the compressed version of the one or more measurements being in accordance with the configuration, and communicating with the UE using one or more parameters calculated based at least in part on the codeword.

Certain aspects provide an apparatus for wireless communication by a UE. The apparatus generally includes a memory, and one or more processors coupled to the memory, the one or more processors and the memory being configured to receive, from a base station, a configuration to be used for compressing one or more measurements corresponding to at least one reference signal using an AI encoder, receive the at least one reference signal, and transmit a codeword to the base station, the codeword being associated with a compression of the one or more measurements in accordance with the configuration.

Certain aspects provide an apparatus for wireless communication by a base station. The apparatus generally includes a memory, and one or more processors coupled to the memory, the one or more processors and the memory being configured to transmit, to a UE, a configuration to be used for compressing one or more measurements corresponding to at least one reference signal using an AI encoder, transmit the at least one reference signal, receive a codeword having a compressed version of the one or more measurements, the compressed version of the one or more measurements being in accordance with the configuration, and communicate with the UE using one or more parameters calculated based at least in part on the codeword.

Certain aspects provide an apparatus for wireless communication by a UE. The apparatus generally includes means for receiving, from a base station, a configuration to be used for compressing one or more measurements corresponding to at least one reference signal using a means for compressing the one or more measurements using AI, means for receiving the at least one reference signal, and means for transmitting a codeword to the base station, the codeword being associated with a compression of the one or more measurements in accordance with the configuration.

Certain aspects provide an apparatus for wireless communication by a base station. The apparatus generally includes means for transmitting, to a UE, a configuration to be used for compressing one or more measurements corresponding to at least one reference signal using a means for compressing the one or more measurements using AI, means for transmitting the at least one reference signal, means for receiving a codeword having a compressed version of the one or more measurements, the compressed version of the one or more measurements being in accordance with the configuration, and means for communicating with the UE using one or more parameters calculated based at least in part on the codeword.

Certain aspects provide a computer-readable medium having instructions stored to cause a UE to receiving, from a base station, a configuration to be used for compressing one or more measurements corresponding to at least one reference signal using an AI encoder, receiving the at least one reference signal, and transmitting a codeword to the base station, the codeword being associated with a compression of the one or more measurements in accordance with the configuration.

Certain aspects provide a computer-readable medium having instructions stored to cause a base station to transmit, to a UE, a configuration to be used for compressing one or more measurements corresponding to at least one reference signal using an AI encoder, transmit the at least one reference signal, receive a codeword having a compressed version of the one or more measurements, the compressed version of the one or more measurements being in accordance with the configuration, and communicate with the UE using one or more parameters calculated based at least in part on the codeword.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
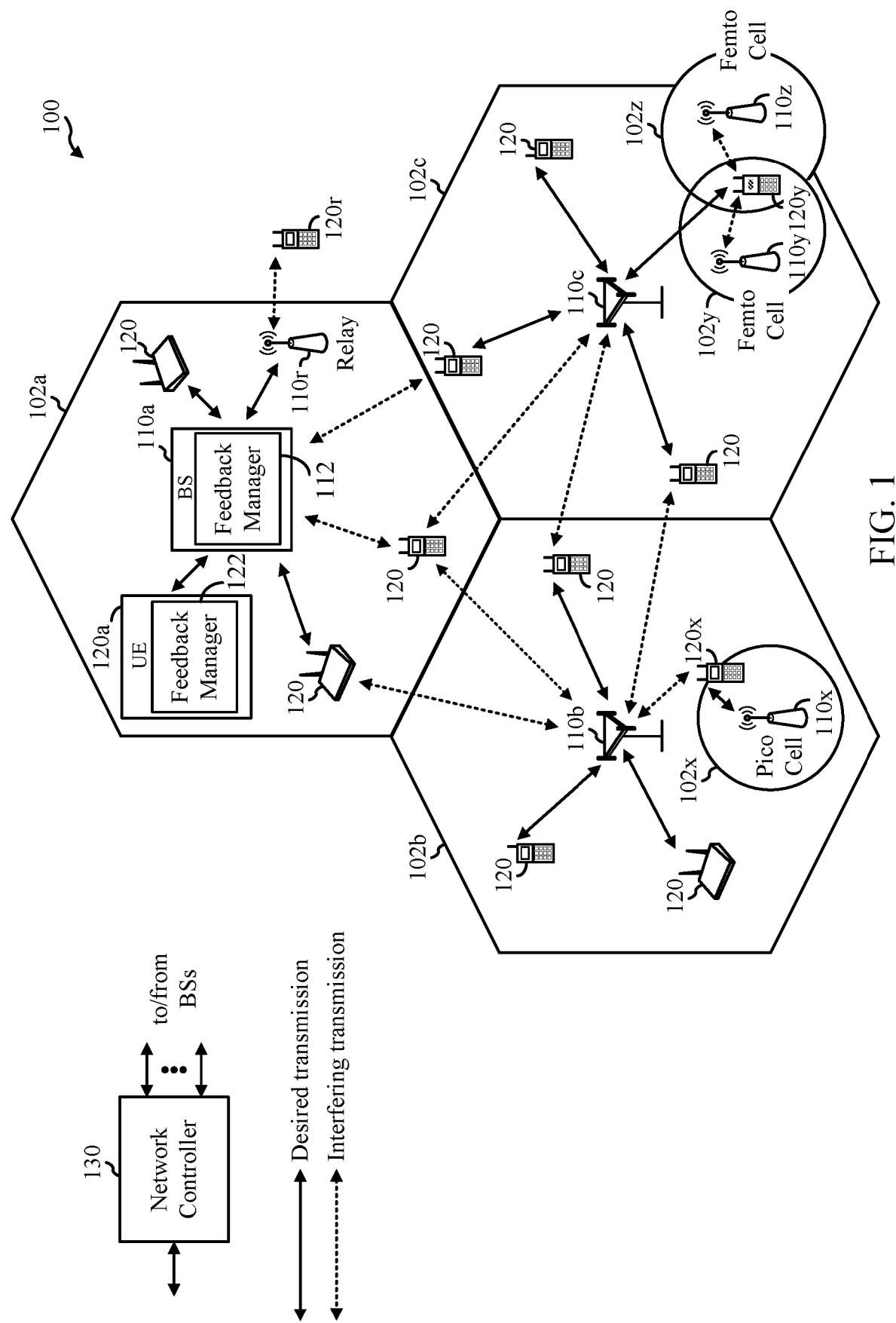
FIG. 1 is a block diagram conceptually illustrating an example telecommunications system, in accordance with certain aspects of the present disclosure.

Artificial intelligence (AI) may be used to improve wireless communications. One example of AI implementation is an artificial neural network. An artificial neural network, which may be composed of an interconnected group of artificial neurons (e.g., neuron models), is a computational device or represents a method performed by a computational device. These neural networks may be used for various applications and/or devices, such as Internet Protocol (IP) cameras, Internet of Things (IoT) devices, autonomous vehicles, and/or service robots.

Convolutional neural networks (CNNs) are a type of feedforward artificial neural network. Convolutional neural networks may include collections of artificial neurons that each have a receptive field and that collectively tile an input space. Convolutional neural networks have numerous applications. In particular, CNNs have broadly been used in the area of pattern recognition and classification.

In layered neural network architectures, the output of a first layer of artificial neurons becomes an input to a second layer of artificial neurons, the output of a second layer of artificial neurons becomes an input to a third layer of artificial neurons, and so on. Convolutional neural networks may be trained to recognize a hierarchy of features. Computation in convolutional neural network architectures may be distributed over a population of processing nodes, which may be configured in one or more computational chains. These multi-layered architectures may be trained one layer at a time and may be fine-tuned using backpropagation.

Some aspects of the present disclosure are directed to feedback signaling using autoencoders. Autoencoders are a type of feedforward neural network where an input may be compressed into a code such that an output can be reconstructed from the code to represent the input closely. For example, the input may pass through an encoder which may be located at a UE for generating a codeword. In one example, the encoder may be a fully-connected artificial neural network (ANN), to produce the codeword. A decoder may be implemented at a base station, which has a similar ANN structure. The decoder may produce an output only using the codeword to obtain an output that is as close to (if not identical) to the input. The autoencoder learns a lower-dimensional representation of data through a training process. This training may be performed using forward propagation and backpropagation. For instance, the encoder and decoder may each have multiple layers having neurons. Each of the neurons may be associated with a weight. During training, an error between the input and the output may be determined, and each weight's contribution to the error may be determined. The weights may be adjusted accordingly using gradient descent to facilitate training of the autoencoder, allowing the compressed version of the input to more closely represent the input.

Aspects of the present disclosure provide apparatus, methods, processing systems, and computer-readable mediums for feedback signaling. In certain aspects of the present disclosure, an AI module (e.g., autoencoder) may be used to compress, at a user-equipment (UE), a received measurement based on a reference signal, where the compressed measurement is to be fed back to a base station (BS). In other words, the measurement may serve as the input to an autoencoder used to generate a codeword by compressing the measurement. The codeword may be fed back to the BS. The BS may decompress the feedback from the UE using an AI module, and calculate one or more parameters (e.g., channel quality parameters, such as channel quality indicator (CQI)) to facilitate communication with the UE. The AI modules may be implemented using neural networks.

In certain aspects, the BS may indicate a configuration to be used by the UE for feedback compression. For example, the BS may indicate the compression ratio to be used, an AI module to be used, or both, based on the type of feedback signaling or the purpose associated with the feedback from the UE. For example, depending on the type of the one or more parameters to be calculated by the BS, or a quantity of the one or more parameters to be calculated by the BS, the BS may configure a different compression ratio to be used for feedback compression at the UE.

The following description provides examples of feedback compression in communication systems, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, a 5G NR RAT network may be deployed.

FIG. 1 illustrates an example wireless communication network 100 in which aspects of the present disclosure may be performed. For example, the wireless communication network 100 may be an NR system (e.g., a 5G NR network).

As illustrated in FIG. 1, the wireless communication network 100 may include a number of base stations (BSs) 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. The BSs 110 communicate with user equipment (UEs) 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile.

According to certain aspects, the BSs 110 and UEs 120 may be configured for feedback management. As shown in FIG. 1, the BS 110a includes a feedback manager 112. The feedback manager 112 may be configured to indicate a configuration for compression of one or more measurements to a UE, in accordance with aspects of the present disclosure. As shown in FIG. 1, the UE 120a includes a feedback manager 122. The feedback manager 122 may be configured to compress the one or more measurements for feedback to the BS in accordance with a configuration indicated by the BS, in accordance with aspects of the present disclosure.

Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may couple to a set of BSs 110 and provide coordination and control for these BSs 110. The network controller 130 may communicate with the BSs 110 via a backhaul. The BSs 110 may also communicate with one another (e.g., directly or indirectly) via wireless or wireline backhaul.

Figure 2:
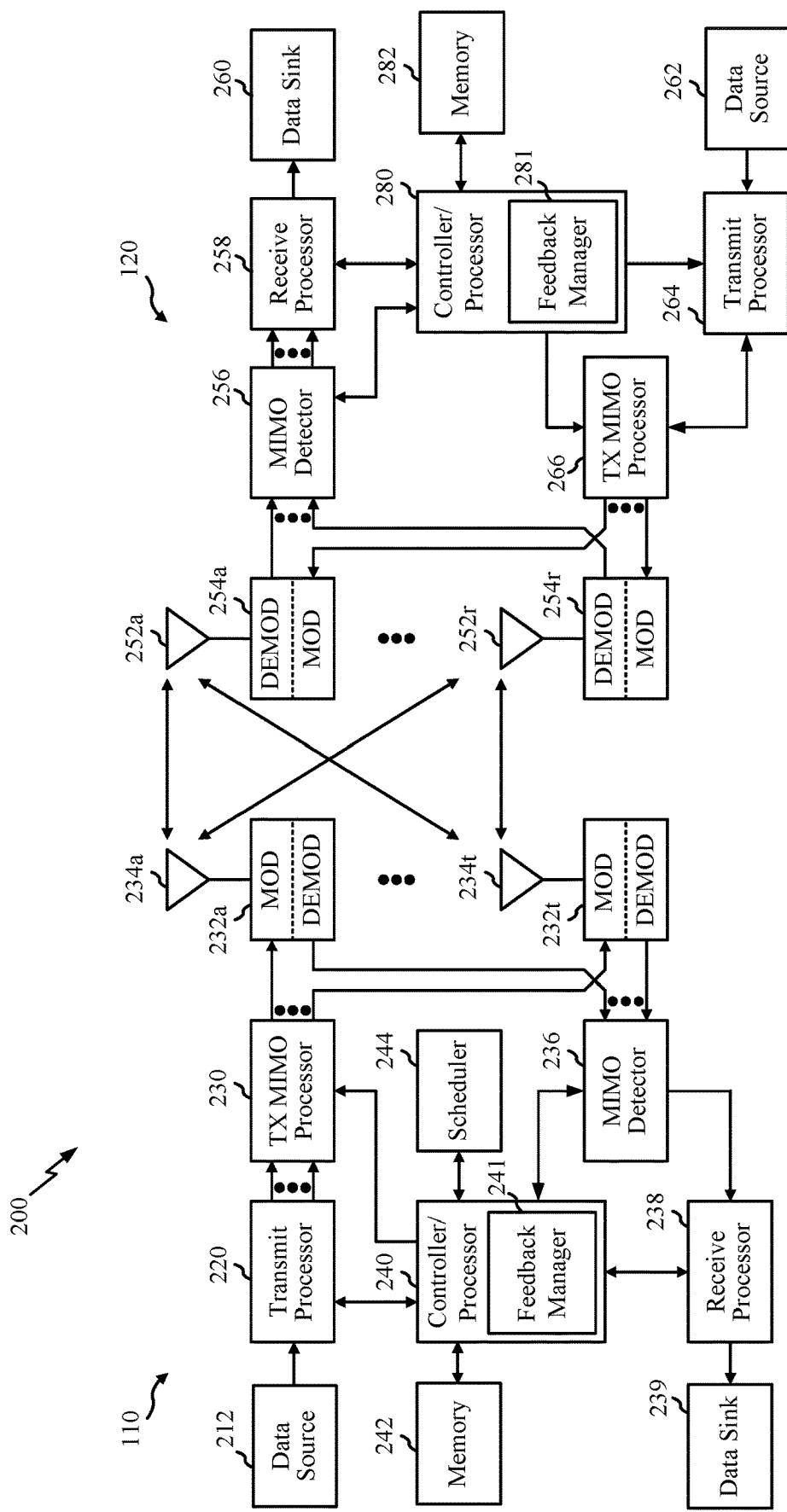
FIG. 2 is a block diagram conceptually illustrating a design of an example a base station (BS) and user equipment (UE), in accordance with certain aspects of the present disclosure.

FIG. 2 illustrates example components of BS 110a and UE 120a (e.g., in the wireless communication network 100 of FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and cell-specific reference signal (CRS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a-232t. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232a-232t may be transmitted via the antennas 234a-234t, respectively.

At the UE 120a, the antennas 252a-252r may receive the downlink signals from the BS 110a and may provide received signals to the demodulators (DEMODs) in transceivers 254a-254r, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the demodulators in transceivers 254a-254r (e.g., for SC-FDM, etc.), and transmitted to the BS 110a. At the BS 110a, the uplink signals from the UE 120a may be received by the antennas 234, processed by the modulators 232, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. A scheduler 244 may schedule UEs for data transmission on the downlink and/or uplink.

The controller/processor 280 and/or other processors and modules at the UE 120a may perform or direct the execution of processes for the techniques described herein. For example, as shown in FIG. 2, the controller/processor 240 of the BS 110a has a feedback manager 241 that may be configured to indicate a configuration for compression of one or more measurements to a UE, according to aspects described herein. As shown in FIG. 2, the controller/processor 280 of the UE 120a has a feedback manager 281 that may be configured to compress the one or more measurements for feedback to the BS in accordance with a configuration indicated by the BS, according to aspects described herein. Although shown at the Controller/Processor, other components of the UE 120a and BS 110a may be used performing the operations described herein.

Example Configuration of AI Modules and Compression Ratios for UE Feedback

Neural networks (NNs) have been used to address various problems in the area of wireless communications. In certain implementations, an auto-encoder structure may be used to encode data for transmission, and a decoder may be used at a receiver to decode the transmission. The encoder and decoder networks may be trained jointly to recover the input to the encoder at the decoder's output. One or more example autoencoders may not be provided information regarding the underlying data distribution or explicit identification of a certain structure for the input to be encoded. The encoder and decoder may be implemented in different devices, such as at a user-equipment (UE) and a base station (BS), respectively, as described in more detail herein.

In some implementations, an autoencoder may be used for transmission of feedback (e.g., channel state information (CSI) feedback) using machine learning (e.g., also referred to as artificial intelligence (AI)). CSI feedback in massive multiple-input multiple-output (MIMO) (e.g., frequency division duplexing (FDD)) systems have overhead for CSI feedback. In some aspects, an autoencoder may be used to reduce overhead associated with CSI feedback. Moreover, non-ML implementations for CSI compression assume channel sparsity and use random projection. Certain aspects of the present disclosure provide techniques that use ML for efficient CSI compression. For instance, a UE may use AI to compress feedback to a BS in accordance with a configuration for the compression to be performed as indicated by the BS.

Figure 3:
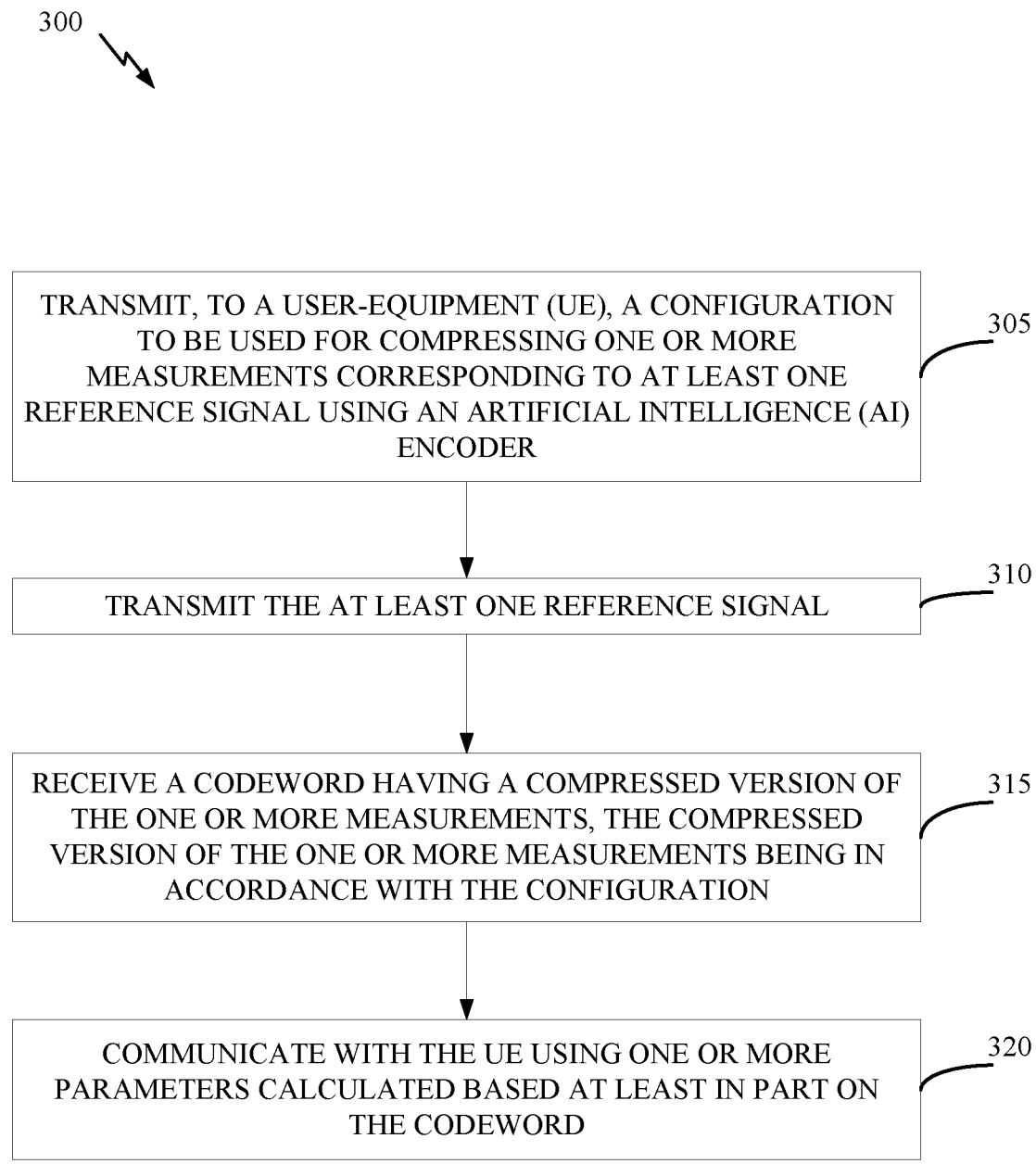
FIG. 3 is a flow diagram illustrating example operations for wireless communication, in accordance with certain aspects of the present disclosure.

FIG. 3 is a flow diagram illustrating example operations 300 for wireless communication, in accordance with certain aspects of the present disclosure. The operations 300 may be performed, for example, by a BS (e.g., such as the BS 110a in the wireless communication network 100).

Operations 300 may be implemented as software components that are executed and run on one or more processors (e.g., controller/processor 240 of FIG. 2). Further, the transmission and reception of signals by the BS in operations 300 may be enabled, for example, by one or more antennas (e.g., antennas 234 of FIG. 2). In certain aspects, the transmission and/or reception of signals by the BS may be implemented via a bus interface of one or more processors (e.g., controller/processor 240) obtaining and/or outputting signals.

The operations 300 may begin, at block 305, with the BS transmitting, to a UE, a configuration to be used for compressing one or more measurements corresponding to at least one reference signal (e.g., CSI-RS) using an artificial intelligence (AI) encoder (e.g., neural network encoder). In certain aspects, the configuration may be transmitted using radio resource control (RRC) signaling, medium access control (MAC)-control element (CE), or downlink control information (DCI). At block 310, the BS may transmit the at least one reference signal.

At block 315, the BS may receive a codeword having a compressed version of the one or more measurements, the compressed version of the one or more measurements being in accordance with the configuration. At block 320, the BS may communicate with the UE using one or more parameters (e.g., channel quality information (CQI), precoding matrix indicator (PMI), rank indicator (RI), reference signal received power (RSRP), or any combination thereof) calculated based at least in part on the codeword. For example, the BS may decompress the codeword using an AI decoder (e.g., neural network decoder), where the one or more parameters are calculated based on the decompressed codeword. In certain implementations, the codeword may be fed to a decoder, and the decoder may directly compute the one or more parameters from the codeword (e.g., without first decompressing the codeword).

In certain aspects, the configuration to be used for the compression may include an indication of a compression ratio associated with the compression. A compression ratio generally refers to a ratio between a size of a compressed output of an encoder and a size of the input to be compressed by the encoder. As an example, when compression is performed using a neural network, different compression ratios may correspond to different neural network architectures used for the compression. The BS may determine the compression ratio based on the one or more parameters to be calculated. For instance, the compression ratio may be determined based on a type of the one or more parameters to be calculated, a quantity of data associated with the one or more parameters to be calculated, or any combination thereof.

In certain aspects, the configuration to be used for the compression may include an indication of at least one AI module to be used for the compression. For example, the indication of the at least one AI module may include an indication of an AI module at the UE that corresponds to an AI module at the base station to be used for the decompression of the codeword, as described in more detail herein. As another example, the indication of the at least one AI module may include an indication of a class of AI modules to be used for the compression. In certain implementations, the BS may determine the indication of the at least one AI module based on a type of the at least one reference signal, a type of the one or more parameters to be calculated, or any combination thereof.

In certain aspects, the BS may receive one or more feedback parameters (e.g., CQI, PMI, RI, RSRP, or any combination thereof) based on the at least one reference signal. For example, the one or more feedback parameters may be multiplexed (e.g., frequency or time-division multiplexed) with the codeword. In this case, the one or more parameters to be used for the communication may be calculated, at block 325, further based on the one or more feedback parameters. In other words, the BS may calculate CQI, PMI, RI, or RSRP by considering both the codeword and the one or more feedback parameters.

Figure 4:
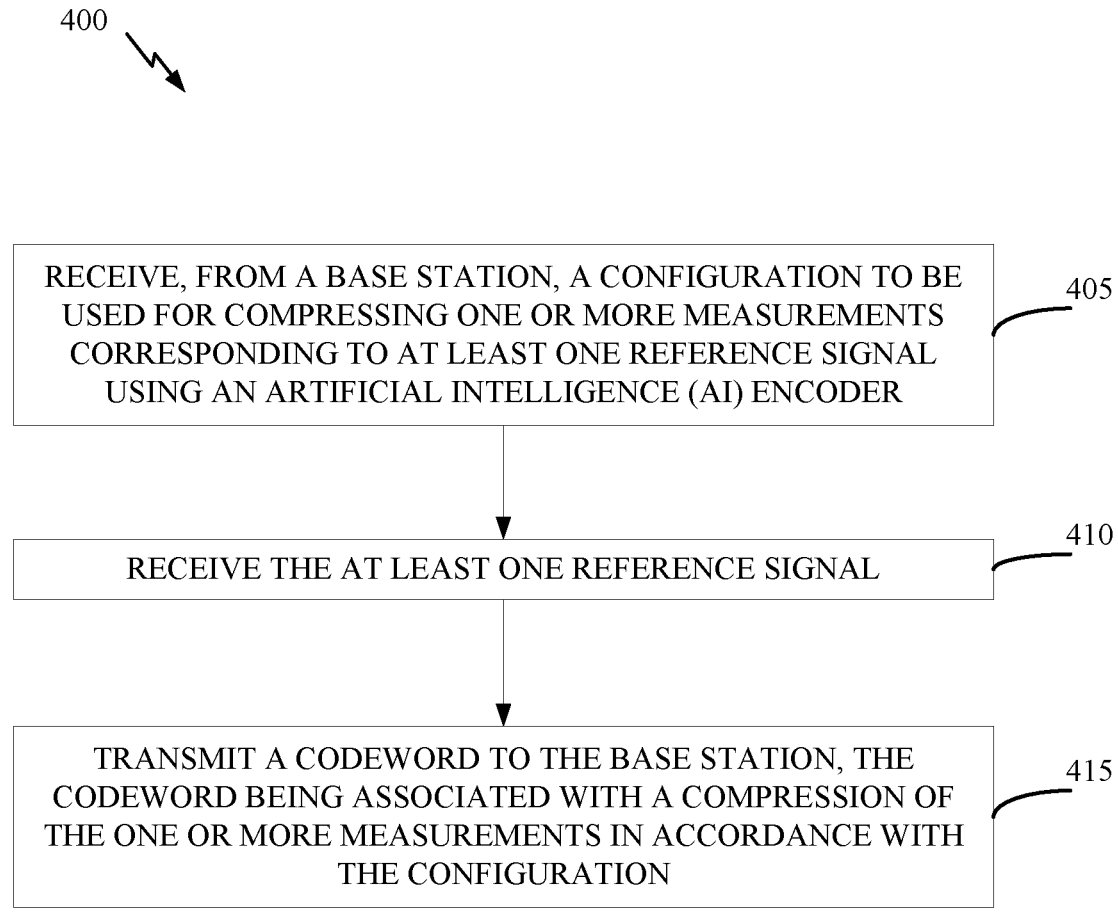
FIG. 4 is a flow diagram illustrating example operations for wireless communication, in accordance with certain aspects of the present disclosure.

FIG. 4 is a flow diagram illustrating example operations 400 for wireless communication, in accordance with certain aspects of the present disclosure. The operations 400 may be performed, for example, by a UE (e.g., such as a UE 120a in the wireless communication network 100).

The operations 400 may be complimentary operations by the UE to the operations 400 performed by the BS. Operations 400 may be implemented as software components that are executed and run on one or more processors (e.g., controller/processor 280 of FIG. 2). Further, the transmission and reception of signals by the UE in operations 400 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 400 may begin, at block 405, with the UE receiving, from a base station, a configuration to be used for compressing one or more measurements corresponding to at least one reference signal using an AI encoder (e.g., neural network encoder). At block 410, the UE may receive the at least one reference signal. At block 415, the UE may transmit a codeword to the base station, the codeword being associated with a compression of the one or more measurements in accordance with the configuration. In some aspects, the UE may communicate with the base station using one or more parameters calculated based on the codeword, as described in more detail herein.

Figure 5:
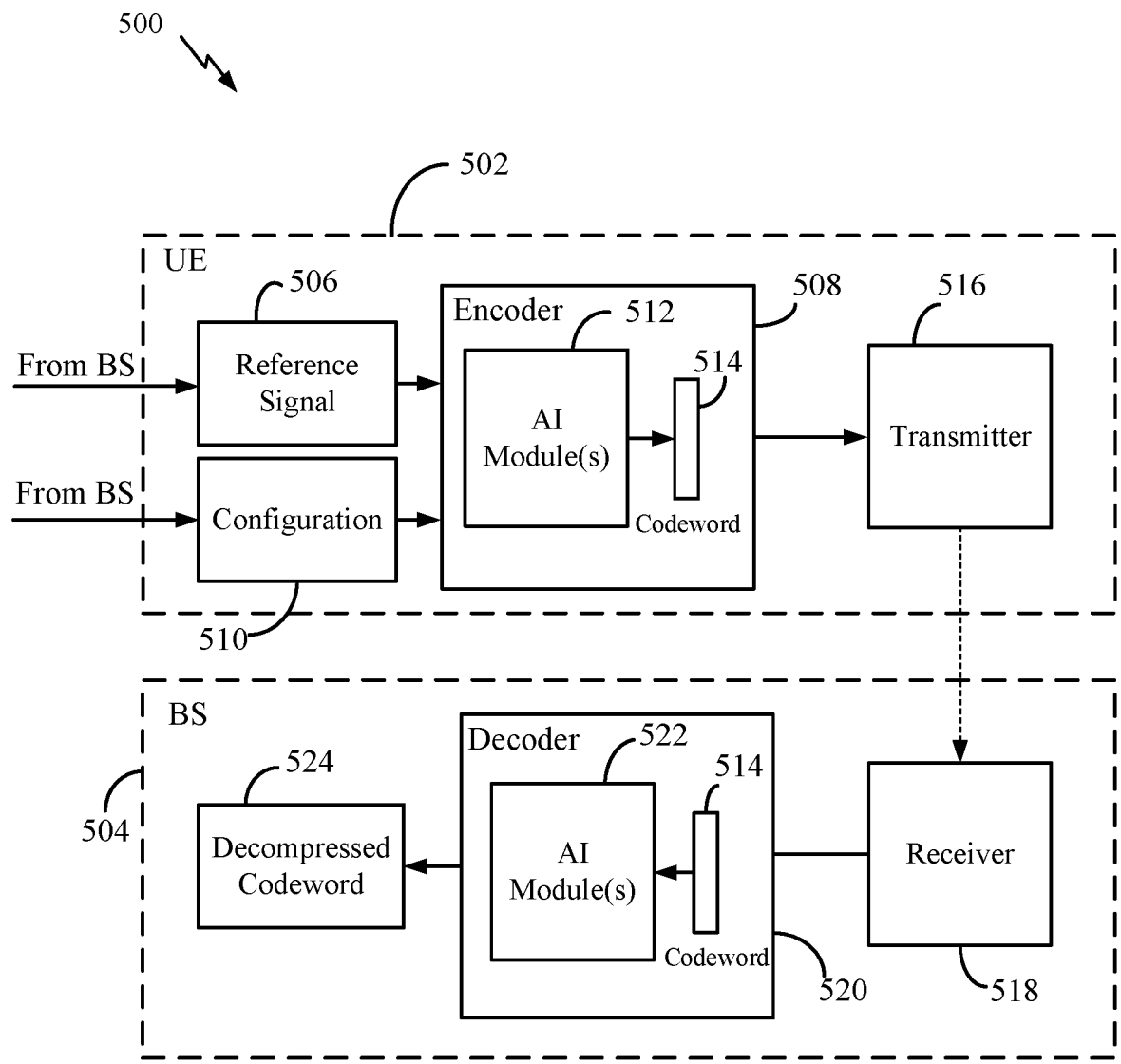
FIG. 5 illustrates a communication system for reference signal feedback using artificial intelligence (AI) compression, in accordance with certain aspects of the present disclosure.

FIG. 5 illustrates a communication system 500 for feedback signaling using AI compression, in accordance with certain aspects of the present disclosure. For example, the communication system 500 may include a UE 502 that may receive, from a BS 504, the reference signal 506. The UE 502 may perform one or more measurements and compress the one or more measurements using an AI encoder 508 (e.g., via one of AI module(s) 512). In certain aspects, the UE 502 may also receive, from the BS 504, a configuration 510 to be used for the compression. As illustrated, the AI encoder 508 may compress one or more measurements corresponding to the reference signal 506 and generate a codeword 514, in accordance with the configuration 510. The codeword 514 may be transmitted to the BS 504 via a transmitter 516. The codeword 514 may be used by the BS to calculate one or more parameters (e.g., CQI, PMI, RI, RSRP, or any combination thereof) for communication with the UE.

As illustrated, the BS 504 may receive the codeword 514 via the receiver 518. The BS 504 may include an AI decoder 520 having one or more AI modules 522 for decompressing the codeword 514 and generating the decompressed codeword 524. The decompressed codeword 524 may be used to calculate the one or more parameters for communication with the UE, as described herein.

As used herein, an AI module may be implemented using any AI algorithm, such as a neural network algorithm. For instance, an AI module at the encoder 508 may be provided an input (e.g., reference signal measurement). The AI module may then compress the input using a neural network algorithm, such as a feedforward neural network algorithm, or a convolution neural network algorithm, to generate the codeword 514. The one or more AI modules 522 at the decoder 520 decompresses the codeword 514 using a corresponding neural network algorithm.

In certain aspects, the configuration 510 may be an indication of a compression ratio to be used for the compression of the one or more measurements corresponding to the reference signal 506, an indication of at least one AI module (one of AI module(s) 512) to be used for the compression of the one or more measurements corresponding to the reference signal 506, or both.

In some aspects, the BS may indicate a compression ratio based on a type of the one or more parameters (e.g., CQI, PMI, RI, RSRP, or a combination thereof), a quantity of data associated with the one or more parameters to be calculated, or a combination thereof. As an example, if the BS is only to calculate CQI based on codeword 514 from the UE, the BS may configure a higher compression ratio resulting in a smaller codeword to be transmitted by the UE. In other words, a smaller codeword transmitted by the UE may be sufficient if the BS plans to only calculate CQI. However, if the BS plans to calculate a combination of CQI and PMI, for example, the BS may configure a lower compression ratio (e.g., resulting in a larger codeword).

In some cases, the configuration 510 indicated by the BS may be an index associated with one of the AI modules 512, which may be configured with a specific compression ratio. In other words, multiple AI modules may be associated with different indices and correspond to different compression ratios, and the configuration 510 may indicate one of the indices associated with the AI modules.

In some cases, the AI encoder 508 at the UE may have different AI modules 512, as described herein. Each of the AI modules 512 at the encoder of the UE may have a corresponding AI module at the decoder 520 of the BS. Thus, the BS may indicate to the UE which AI module to use for encoding (e.g., compressing) the one or more measurements corresponding to the reference signal 506 to generate the codeword 514. The indication of which AI module to be used by the UE to generate the codeword may be based on the AI module (e.g., one of AI modules 522) at the decoder 520 of the BS to be used for decoding (e.g., decompressing) the codeword.

In some cases, the UE may have different classes of AI modules, each class of AI modules configured for compressing different types of signals (e.g., reference signals), or configured to compress signals for different purposes (e.g., calculation of CQI or PMI). For example, one AI module may be trained for compression of CSI measurements, whereas another AI module may be trained for different purposes. Thus, the BS may indicate the class of AI modules that the UE is to use. In some aspects, the BS may indicate an index associated with a specific AI module to be used for compression and generation of the codeword 514. The BS may determine the index associated with the specific AI module based on a type or quantity of parameters to be calculated at the BS. For example, the greater the quantity of the one or more parameters, the lower the compression ratio to be selected may be for generating the codeword.

A BS may configure different AI modules for feedback of different parameters/parameter combinations and different compression ratios for each AI module as described herein. Depending on the compressed data's intended usage to derive CQI, CQI/PMI, PMI only, RI only or a combination thereof, or L1-RSRP, a specific AI module and compression ratio may be configured and used for such purpose. For instance, a higher complexity for deriving the one or more parameters may result in a lower compression ratio (larger payload to transmit) to be selected, while a lower complexity for deriving the one or more parameters may result in a higher compression ratio (smaller payload to transmit) to be selected.

In some cases, the compressed data may be multiplexed with other parameters such as CQI, RI, PMI, L1-RSRP for example. For instance, the UE may calculate one or more feedback parameters, such as CQI, RI, PMI, or RSRP, and multiplex the one or more feedback parameters with the compressed data (codeword) for transmission to the BS. The AI modules for different purposes (at the UE and the BS) may be configured and AI module indices may be signaled to UE via RRC, MAC-CE, or physical downlink control channel (PDCCH), as described herein. In certain aspects, the compression ratio may be signaled to the UE via RRC, MAC-CE, or PDCCH.

While certain implementations of the present application have been described for neural networks to facilitate understanding, the aspects described herein may be implemented for any artificial intelligence (AI) algorithms. Moreover, the aspects described herein are applicable to any type of feedback from the UE and is not limited to specific examples described herein, such as CSI feedback.

Figure 6:
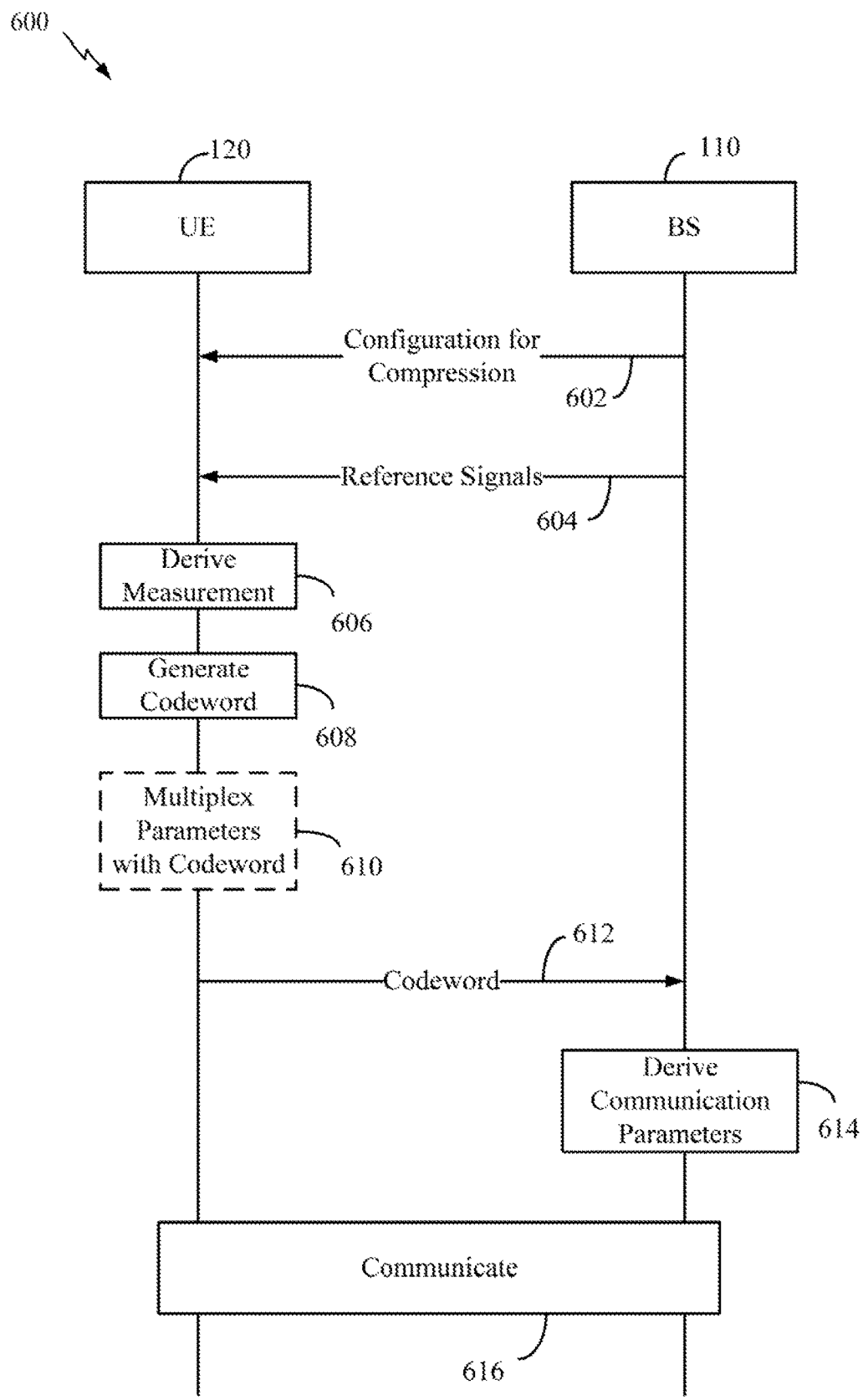
FIG. 6 is a call flow diagram illustrating example operations for feedback signaling using AI compression, in accordance with certain aspects of the present disclosure.

FIG. 6 is a call flow diagram illustrating example operations 600 for feedback signaling using AI compression, in accordance with certain aspects of the present disclosure. As illustrated, the UE 120 may receive a configuration 602 (e.g., associated with configuration 510) for compression of one or more measurements. The UE may also receive one or more reference signals 604 (e.g., associated with reference signal 506). While the one or more reference signals 604 are received after the configuration 602 in the example operations 600 to facilitate understanding, the one or more reference signals 604 may be received before the configuration 602 in some scenarios. At block 606, the UE may derive the one or more measurements based on the one or more reference signals 604, and at block 608, generate a codeword 612 in accordance with the configuration for compression. For example, as described herein, the UE may generate the codeword 612 using one or more AI modules, such as AI module(s) 512.

In some cases, optionally at block 610, the UE may multiplex one or more parameters with the codeword 612. These parameters may include CQI, PMI, RI, RSRP, or any combination thereof.

As illustrated, the UE may transmit the codeword 612 (e.g., along with the one or more parameter multiplexed with the codeword) to the BS 110. At block 614, the BS may derive communication parameters based on the codeword 612. For example, the BS may include the AI decoder 520 having one or more AI modules 522 to decompress the codeword 612 and generate a decompressed codeword. The decompressed codeword may be used to calculate the one or more communication parameters. In some aspects, the one or more communication parameters may be calculated using the codeword 612, as well as the one or more parameters (e.g., CQI, PMI, RI, RSRP) multiplexed with the codeword. At block 616, communication between the BS and UE may occur using the communication parameters.

Figure 7:
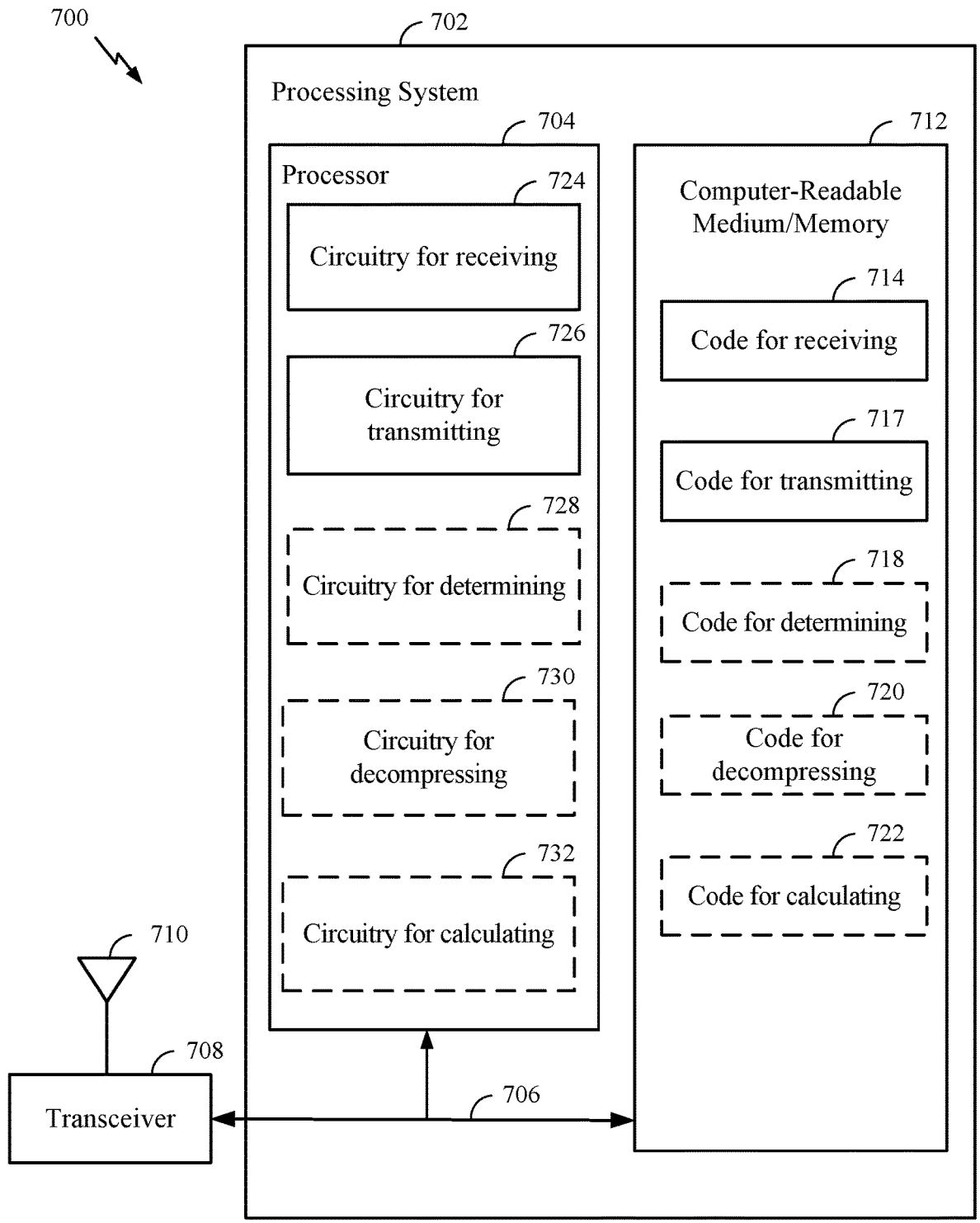
FIG. 7 illustrates a communications device that may include various components configured to perform operations for the techniques disclosed herein in accordance with aspects of the present disclosure.

FIG. 7 illustrates a communications device 700 that may include various components (e.g., corresponding to means-plus-function components) configured to perform operations for the techniques disclosed herein, such as the operations illustrated in FIG. 3. The communications device 700 includes a processing system 702 coupled to a transceiver 708. The transceiver 708 is configured to transmit and receive signals for the communications device 700 via an antenna 710, such as the various signals as described herein. The processing system 702 may be configured to perform processing functions for the communications device 700, including processing signals received and/or to be transmitted by the communications device 700.

The processing system 702 includes a processor 704 coupled to a computer-readable medium/memory 712 via a bus 706. In certain aspects, the computer-readable medium/memory 712 is configured to store instructions (e.g., computer-executable code) that when executed by the processor 704, cause the processor 704 to perform the operations illustrated in FIG. 3, or other operations for performing the various techniques discussed herein. In certain aspects, computer-readable medium/memory 712 stores code 714 for receiving; and code 717 for transmitting. The computer-readable medium/memory 712 may optionally also include code 718 for determining, code 720 (e.g., an example of means for) for decompressing, and code 722 (e.g., an example of means for) for calculating. One or more of code 714, 717, 718, 720, 722 may be executed by a general-purpose processor, a digital signal processor (DSP), an application-specific integrated circuit (ASIC), a field-programmable gate array (FPGA) or other programmable logic device.

In certain aspects, alternatively or additionally, the processor 704 has circuitry configured to implement the code stored in the computer-readable medium/memory 712. The processor 704 includes circuitry 724 (e.g., an example of means for) for receiving, and circuitry 726 (e.g., an example of means for) for transmitting. The processor 704 may also optionally include circuitry 728 (e.g., an example of means for) for determining, circuitry 730 (e.g., an example of means for) for decompressing, and circuitry 732 (e.g., an example of means for) for calculating. One or more of circuitry 724, 726, 728, 730 may be implemented by one or more of a general-purpose processor, a DSP, an ASIC, a FPGA or other programmable logic device. In certain aspects, processor 704 is an example of the feedback manager 122.

The transceiver 708 may provide a means for receiving information such as packets, user data, or control information associated with various information channels (e.g., control channels, data channels, and information related to feedback, etc.). Information may be passed on to other components of the device 700. The transceiver 708 may be an example of aspects of the transceiver 254 described with reference to FIG. 2. The antenna 710 may correspond to a single antenna or a set of antennas. The transceiver 708 may provide means for transmitting signals generated by other components of the device 700.

Figure 8:
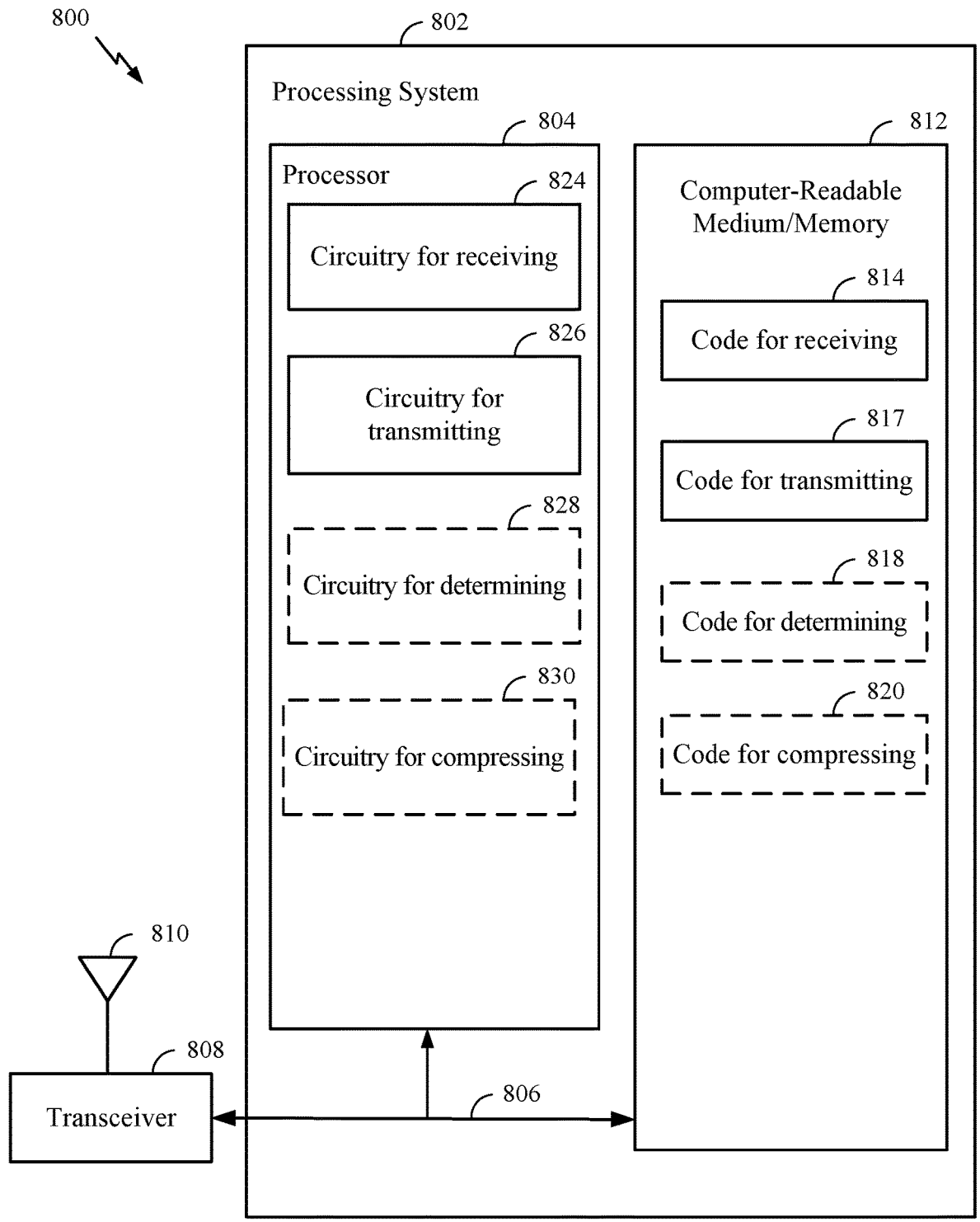
FIG. 8 illustrates a communications device that may include various components configured to perform operations for the techniques disclosed herein in accordance with aspects of the present disclosure.

FIG. 8 illustrates a communications device 800 that may include various components (e.g., corresponding to means-plus-function components) configured to perform operations for the techniques disclosed herein, such as the operations illustrated in FIG. 4. The communications device 800 includes a processing system 802 coupled to a transceiver 808. The transceiver 808 is configured to transmit and receive signals for the communications device 800 via an antenna 810, such as the various signals as described herein. The processing system 802 may be configured to perform processing functions for the communications device 800, including processing signals received and/or to be transmitted by the communications device 800.

The processing system 802 includes a processor 804 coupled to a computer-readable medium/memory 812 via a bus 806. In certain aspects, the computer-readable medium/memory 812 is configured to store instructions (e.g., computer-executable code) that when executed by the processor 804, cause the processor 804 to perform the operations illustrated in FIG. 4, or other operations for performing the various techniques discussed herein. In certain aspects, computer-readable medium/memory 812 stores code 814 (e.g., an example of means for) for receiving; and code 817 (e.g., an example of means for) for transmitting. The computer-readable medium/memory 812 may also optionally store code 818 (e.g., an example of means for) for determining, and code 820 (e.g., an example of means for) for compressing. One or more of code 814, 817, 818, 820 may be executed by a general-purpose processor, a DSP, an ASIC, a field FPGA or other programmable logic device.

In certain aspects, the processor 804 has circuitry configured to implement the code stored in the computer-readable medium/memory 812. The processor 804 includes circuitry 824 (e.g., an example of means for) for receiving, and circuitry 826 (e.g., an example of means for) for transmitting. The processor 804 may also optionally include circuitry 828 (e.g., an example of means for) for determining, and circuitry 830 (e.g., an example of means for) for compressing. One or more of circuitry 824, 826, 828, 830 may be implemented by one or more of a general-purpose processor, a DSP, an ASIC, a FPGA or other programmable logic device. In certain aspects, processor 804 is an example of the feedback manager 112.

The transceiver 808 may provide a means for receiving information such as packets, user data, or control information associated with various information channels (e.g., control channels, data channels, and information related to feedback, etc.). Information may be passed on to other components of the device 800. The transceiver 808 may be an example of aspects of the transceiver 254 described with reference to FIG. 2. The antenna 810 may correspond to a single antenna or a set of antennas. The transceiver 808 may provide means for transmitting signals generated by other components of the device 800.

The feedback manager 112 or 122 may support wireless communication in accordance with examples as disclosed herein.

The feedback manager 112 or 122 may be an example of means for performing various aspects described herein. The feedback manager 112 or 122, or its sub-components, may be implemented in hardware (e.g., in uplink resource management circuitry). The circuitry may comprise of processor, DSP, an ASIC, a FPGA or other programmable logic device, discrete gate or transistor logic, discrete hardware components, or any combination thereof designed to perform the functions described in the present disclosure.

In another implementation, the feedback manager 112 or 122, or its sub-components, may be implemented in code (e.g., as feedback management software or firmware) executed by a processor, or any combination thereof. If implemented in code executed by a processor, the functions of the feedback manager 112 or 122, or its sub-components may be executed by a general-purpose processor, a DSP, an ASIC, a FPGA or other programmable logic device.

In some examples, the feedback manager 112 or 122 may be configured to perform various operations (e.g., receiving, determining, transmitting) using or otherwise in cooperation with the transceiver 708/808.

The feedback manager 112 or 122, or its sub-components, may be physically located at various positions, including being distributed such that portions of functions are implemented at different physical locations by one or more physical components. In some examples, the feedback manager 112 or 122, or its sub-components, may be a separate and distinct component in accordance with various aspects of the present disclosure. In some examples, the feedback manager 112 or 122, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

EXAMPLE ASPECTS

Aspect 1. A method for wireless communication by a user-equipment (UE), comprising: receiving, from a base station, a configuration to be used for compressing one or more measurements corresponding to at least one reference signal using an artificial intelligence (AI) encoder; receiving the at least one reference signal; and transmitting a codeword to the base station, the codeword being associated with a compression of the one or more measurements in accordance with the configuration.

Aspect 2. The method of aspect 1, wherein the configuration to be used for compressing the one or more measurements comprises an indication of a compression ratio associated with the compression.

Aspect 3. The method of aspect 2, wherein the compression ratio corresponds to a ratio between a size of the one or more measurements to be compressed and the codeword generated by the compression.

Aspect 4. The method of any one of aspects 1-3, wherein the at least one reference signal comprises at least one channel state information (CSI)-reference signal (RS).

Aspect 5. The method of any one of aspects 1-4, wherein the configuration to be used for the compression comprises an indication of at least one AI module to be used for the compression.

Aspect 6. The method of aspect 5, wherein the indication of the at least one AI module comprises an indication of a class of AI modules to be used for the compression.

Aspect 7. The method of any one of aspects 1-6, wherein the configuration is received via radio resource control (RRC) signaling, medium access control (MAC)-control element (CE), or downlink control information (DCI).

Aspect 8. The method of any one of aspects 1-7, further comprising: determining one or more feedback parameters based on the at least one reference signal; and transmitting the one or more feedback parameters to the base station.

Aspect 9. The method of aspect 8, wherein transmitting the one or more feedback parameters comprises multiplexing the one or more feedback parameters with the codeword.

Aspect 10. The method of any one of aspects 8-9, wherein the at least one reference signal comprises at least one CSI-RS, and wherein the one or more feedback parameters comprise channel quality information, precoding matrix indicator (PMI), rank indicator (RI), reference signal received power (RSRP), or any combination thereof.

Aspect 11. A method for wireless communication by a base station, comprising: transmitting, to a user-equipment (UE), a configuration to be used for compressing one or more measurements corresponding to at least one reference signal using an artificial intelligence (AI) encoder; transmitting the at least one reference signal; receiving a codeword having a compressed version of the one or more measurements, the compressed version of the one or more measurements being in accordance with the configuration; and communicating with the UE using one or more parameters calculated based at least in part on the codeword.

Aspect 12. The method of aspect 11, further comprising decompressing the codeword using an AI decoder, wherein the one or more parameters are calculated based on the decompressed codeword.

Aspect 13. The method of any one of aspects 11-12, wherein the at least one reference signal comprises at least one channel state information (CSI)-reference signal (RS).

Aspect 14. The method of any one of aspects 11-13, wherein the configuration to be used for the compression comprises an indication of a compression ratio associated with the compression.

Aspect 15. The method of aspect 14, wherein the compression ratio corresponds to a ratio between a size of the one or more measurements and the codeword having the compressed version of the one or more measurements.

Aspect 16. The method of any one of aspects 14-15, further comprising determining the compression ratio based on the one or more parameters to be calculated.

Aspect 17. The method of aspect 16, wherein the compression ratio is determined based on a type of the one or more parameters to be calculated, a quantity of data associated with the one or more parameters to be calculated, or any combination thereof.

Aspect 18. The method of any one of aspects 11-17, wherein the configuration to be used for the compression comprises an indication of at least one AI module to be used for the compression.

Aspect 19. The method of aspect 18, wherein the indication of the at least one AI module comprises an indication of an AI module at the UE, the AI module at the UE corresponding to an AI module at the base station to be used for the calculation of the one or more parameters.

Aspect 20. The method of any one of aspects 18-19, wherein the indication of the at least one AI module comprises an indication of a class of AI modules to be used for the compression.

Aspect 21. The method of any one of aspects 18-20, further comprising determining the indication of the at least one AI module based on a type of the at least one reference signal, a type of the one or more parameters to be calculated, or any combination thereof.

Aspect 22. The method of any one of aspects 11-21, wherein the configuration is transmitted via radio resource control (RRC) signaling, medium access control (MAC)-control element (CE), or downlink control information (DCI).

Aspect 23. The method of any one of aspects 11-22, further comprising receiving one or more feedback parameters based on the at least one reference signal, wherein the one or more parameters to be used for the communication is calculated further based on the one or more feedback parameters.

Aspect 24. The method of aspect 23, wherein the one or more feedback parameters is multiplexed with the codeword.

Aspect 25. The method of any one of aspects 11-24, wherein the at least one reference signal comprises at least one CSI-RS, and wherein the one or more parameters comprise channel quality information (CQI), precoding matrix indicator (PMI), rank indicator (RI), reference signal received power (RSRP), or any combination thereof.

Aspect 26. An apparatus comprising means for performing the method of any of aspects 1 through 25.

Aspect 27. An apparatus comprising at least one processor and a memory coupled to the at least one processor, the memory comprising code executable by the at least one processor to cause the apparatus to perform the method of any of aspects 1 through 25.

Aspect 28. A computer readable medium storing computer executable code thereon for wireless communications that, when executed by at least one processor, cause an apparatus to perform the method of any of aspects 1 through 25.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The techniques described herein may be used for the wireless networks and radio technologies mentioned above as well as other wireless networks and radio technologies. For clarity, while aspects may be described herein using terminology commonly associated with 3G, 4G, and/or 5G wireless technologies, aspects of the present disclosure can be applied in other generation-based communication systems.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (e.g., 6 RBs), and there may be 1, 2, 4, 8, or 16 subbands for system bandwidth of 1.25, 2.5, 5, 10 or 20 MHz, respectively. In LTE, the basic transmission time interval (TTI) or packet duration is the 1 ms subframe.

NR may utilize OFDM with a CP on the uplink and downlink and include support for half-duplex operation using TDD. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing. Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In some examples, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations—FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communication by a user-equipment (UE), comprising:
   receiving, from a network entity, a first configuration to be used for compressing one or more first measurements and a second configuration to be used for compressing one or more second measurements corresponding to at least one reference signal using an artificial intelligence (AI) encoder;
   receiving the at least one reference signal; and
   transmitting a codeword to the network entity, the codeword being associated with a compression of the one or more first measurements in accordance with the first configuration or the one or more second measurements in accordance with the second configuration.

2. The method of claim 1, wherein:
   the first configuration to be used for compressing the one or more first measurements comprises a first indication of a first compression ratio associated with the compression, and
   the second configuration to be used for compressing the one or more second measurements comprises a second indication of a second compression ratio associated with the compression.

3. The method of claim 2, wherein:
the first compression ratio corresponds to a ratio between a size of the one or more first measurements to be compressed and the codeword generated by the compression, and
the second compression ratio corresponds to a ratio between a size of the one or more second measurements to be compressed and the codeword generated by the compression.

4. The method of claim 1, wherein the at least one reference signal comprises at least one channel state information (CSI)-reference signal (RS).

5. The method of claim 1, wherein:
the first configuration to be used for the compression comprises a first indication of at least one first AI module to be used for the compression, and
the second configuration to be used for the compression comprises a second indication of at least one second AI module to be used for the compression.

6. The method of claim 5, wherein:
the first indication of the at least one first AI module comprises an indication of a first class of AI modules to be used for the compression, and
the second indication of the at least one second AI module comprises an indication of a second class of AI modules to be used for the compression.

7. The method of claim 1, wherein the first configuration and the second configuration are received via radio resource control (RRC) signaling, medium access control (MAC)-control element (CE), or downlink control information (DCI).

8. The method of claim 1, further comprising:
determining one or more feedback parameters based on the at least one reference signal; and
transmitting the one or more feedback parameters to the network entity.

9. The method of claim 8, wherein transmitting the one or more feedback parameters comprises multiplexing the one or more feedback parameters with the codeword.

10. The method of claim 8, wherein the at least one reference signal comprises at least one channel state information (CSI)-reference signal (RS), and wherein the one or more feedback parameters comprise channel quality information, precoding matrix indicator (PMI), rank indicator (RI), reference signal received power (RSRP), or any combination thereof.

11. A method for wireless communication by a network entity, comprising:
transmitting a first configuration to be used for compressing one or more first measurements and a second configuration to be used for compressing one or more second measurements corresponding to at least one reference signal using an artificial intelligence (AI) encoder;
transmitting the at least one reference signal;
receiving a codeword having a compressed version of the one or more first measurements in accordance with the first configuration or the one or more second measurements in accordance with the second configuration; and
communicating using one or more parameters calculated based at least in part on the codeword.

12. The method of claim 11, further comprising decompressing the codeword using an AI decoder, wherein the one or more parameters are calculated based on the decompressed codeword.

13. The method of claim 11, wherein the at least one reference signal comprises at least one channel state information (CSI)-reference signal (RS).

14. The method of claim 11, wherein:
the first configuration to be used for the compression comprises a first indication of a first compression ratio associated with the compression, and
the second configuration to be used for the compression comprises a second indication of a second compression ratio associated with the compression.

15. The method of claim 14, wherein:
the first compression ratio corresponds to a ratio between a size of the one or more first measurements and the codeword having the compressed version of the one or more first measurements, and
the second compression ratio corresponds to a ratio between a size of the one or more second measurements and the codeword having the compressed version of the one or more second measurements.

16. The method of claim 14, further comprising determining the first compression ratio based on the one or more parameters to be calculated.

17. The method of claim 16, wherein the first compression ratio is determined based on a type of the one or more parameters to be calculated, a quantity of data associated with the one or more parameters to be calculated, or any combination thereof.

18. The method of claim 11, wherein:
the first configuration to be used for the compression comprises a first indication of at least one first AI module to be used for the compression, and
the second configuration to be used for the compression comprises a second indication of at least one second AI module to be used for the compression.

19. The method of claim 18, wherein the first indication of the at least one first AI module comprises an indication of an AI module at a user equipment (UE), the AI module at the UE corresponding to an AI module at the network entity to be used for the calculation of the one or more parameters.

20. The method of claim 18, wherein:
the first indication of the at least one first AI module comprises an indication of a first class of AI modules to be used for the compression, and
the second indication of the at least one second AI module comprises an indication of a second class of AI modules to be used for the compression.

21. The method of claim 18, further comprising determining the first indication of the at least one first AI module based on a type of the at least one reference signal, a type of the one or more parameters to be calculated, or any combination thereof.

22. The method of claim 11, wherein the first configuration and the second configuration are transmitted via radio resource control (RRC) signaling, medium access control (MAC)-control element (CE), or downlink control information (DCI).

23. The method of claim 11, further comprising receiving one or more feedback parameters based on the at least one reference signal, wherein the one or more parameters to be used for the communication is calculated further based on the one or more feedback parameters.

24. The method of claim 23, wherein the one or more feedback parameters is multiplexed with the codeword.

25. The method of claim 11, wherein the at least one reference signal comprises at least one channel state information (CSI)-reference signal (RS), and wherein the one or more parameters comprise channel quality information (CQI), precoding matrix indicator (PMI), rank indicator (RI), reference signal received power (RSRP), or any combination thereof.

26. An apparatus for wireless communication by a user-equipment (UE), comprising:
means for receiving, from a network entity, a first configuration to be used for compressing one or more first measurements and a second configuration to be used for compressing one or more second measurements corresponding to at least one reference signal using a means for compressing the one or more first measurements and the one or more second measurements using artificial intelligence (AI);
means for receiving the at least one reference signal; and
means for transmitting a codeword to the network entity, the codeword being associated with a compression of the one or more first measurements in accordance with the first configuration or the one or more second measurements in accordance with the second configuration.

27. An apparatus for wireless communication by a network entity, comprising:
means for transmitting a first configuration to be used for compressing one or more first measurements and a second configuration to be used for compressing one or more second measurements corresponding to at least one reference signal using a means for compressing the one or more first measurements and the or more second measurements using artificial intelligence (AI);
means for transmitting the at least one reference signal;
means for receiving a codeword having a compressed version of the one or more first measurements in accordance with the first configuration or the one or more second measurements in accordance with the second configuration; and
means for communicating using one or more parameters calculated based at least in part on the codeword.

28. A user equipment (UE) comprising:
a memory; and
a processor coupled to the memory, the processor being configured to:
receive, from a network entity, a first configuration to be used to compress one or more first measurements and a second configuration to be used to compress one or more second measurements corresponding to at least one reference signal using an artificial intelligence (AI) encoder;
receive the at least one reference signal; and
transmit a codeword to the network entity, the codeword being associated with a compression of the one or more first measurements in accordance with the first configuration or the one or more second measurements in accordance with the second configuration.

29. The UE of claim 28, wherein:
the first configuration comprises a first indication of a first compression ratio associated with the compression, the first compression ratio corresponds to a ratio between a size of the one or more first measurements to be compressed and the codeword generated by the compression; and
the second configuration comprises a second indication of a second compression ratio associated with the compression, the second compression ratio corresponds to a ratio between a size of the one or more second measurements to be compressed and the codeword generated by the compression.

30. A network entity comprising:
a memory; and
a processor coupled to the memory, the processor being configured to:
transmit a first configuration to be used to compress one or more first measurements and a second configuration to be used to compress one or more second measurements corresponding to at least one reference signal using an artificial intelligence (AI) encoder;
transmit the at least one reference signal;
receive a codeword having a compressed version of the one or more first measurements in accordance with the first configuration or the one or more second measurements in accordance with the second configuration; and
communicate using one or more parameters calculated based at least in part on the codeword.

31. The network entity of claim 30, wherein:
the first configuration comprises a first indication of a first compression ratio associated with the compression, the first compression ratio corresponds to a ratio between a size of the one or more first measurements and the codeword having the compressed version of the one or more first measurements; and
the second configuration comprises a second indication of a second compression ratio associated with the compression, the second compression ratio corresponds to a ratio between a size of the one or more second measurements and the codeword having the compressed version of the one or more second measurements.

32. A non-transitory computer-readable medium comprising executable instructions that, when executed by one or more processors of a user equipment (UE), cause the UE to:
receive, from a network entity, a first configuration to be used to compress one or more first measurements and a second configuration to be used to compress one or more second measurements corresponding to at least one reference signal using an artificial intelligence (AI) encoder;
receive the at least one reference signal; and
transmit a codeword to the network entity, the codeword being associated with a compression of the one or more first measurements in accordance with the first configuration or the one or more second measurements in accordance with the second configuration.

33. The non-transitory computer-readable medium of claim 32, wherein:
the first configuration comprises a first indication of a first compression ratio associated with the compression, the first compression ratio corresponds to a ratio between a size of the one or more first measurements to be compressed and the codeword generated by the compression; and
the second configuration comprises a second indication of a second compression ratio associated with the compression, the second compression ratio corresponds to a ratio between a size of the one or more second measurements to be compressed and the codeword generated by the compression.

34. A non-transitory computer-readable medium comprising executable instructions that, when executed by one or more processors of a network entity, cause the network entity to:
transmit a first configuration to be used to compress one or more first measurements and a second configuration to be used to compress one or more second measurements corresponding to at least one reference signal using an artificial intelligence (AI) encoder;

transmit the at least one reference signal;

receive a codeword having a compressed version of the one or more first measurements in accordance with the first configuration or the one or more second measurements in accordance with the second configuration; and communicate using one or more parameters calculated based at least in part on the codeword.

35. The non-transitory computer-readable medium of claim 34, wherein:

the first configuration comprises a first indication of a first compression ratio associated with the compression, the first compression ratio corresponds to a ratio between a size of the one or more first measurements and the codeword having the compressed version of the one or more first measurements; and the second configuration comprises a second indication of a second compression ratio associated with the compression, the second compression ratio corresponds to a ratio between a size of the one or more second measurements and the codeword having the compressed version of the one or more second measurements.

* * * * *